G. H. BENTON.
GATE VALVE.
APPLICATION FILED MAY 1, 1907.
901,146.
Patented Oct. 13, 1908.
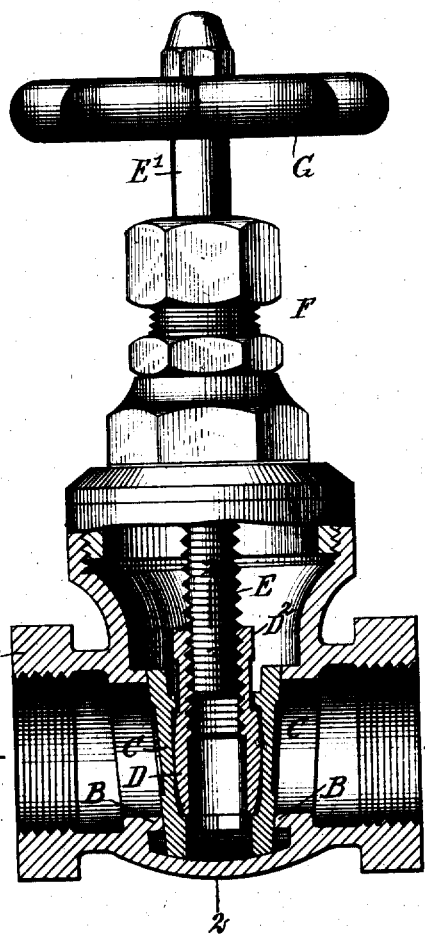
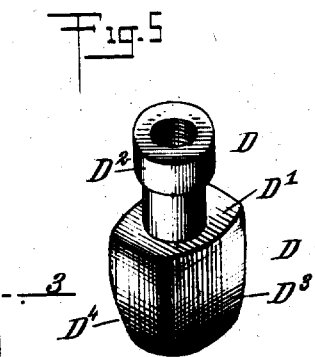
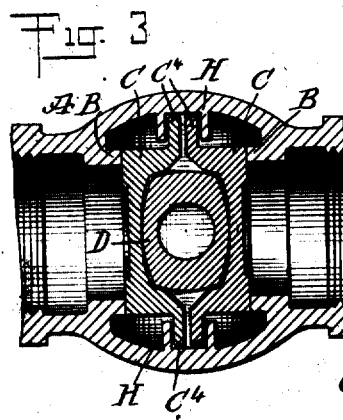
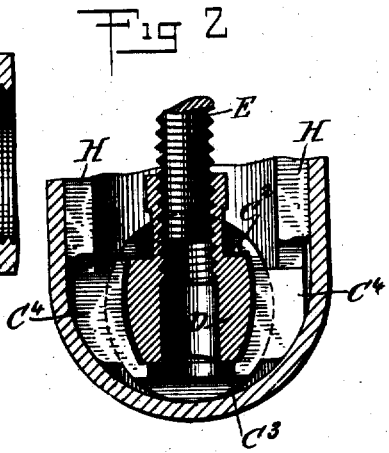
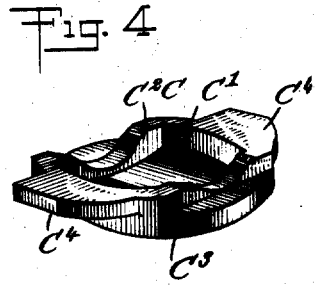
WITNESSES
E. G. Bromley.
INVENTOR
George H. Benton.
BY Munn & Co.
ATTORNEYS

UNITED STATES PATENT OFFICE.

GEORGE H. BENTON, OF METUCHEN, NEW JERSEY.

GATE-VALVE.

No. 901,146.　　　Specification of Letters Patent.　　　Patented Oct. 13, 1908.

Application filed May 1, 1907. Serial No. 371,212.

*To all whom it may concern:*

Be it known that I, GEORGE H. BENTON, a citizen of the United States, and a resident of Metuchen, in the county of Middlesex and State of New Jersey, have invented a new and Improved Gate-Valve, of which the following is a full, clear, and exact description.

The object of the invention is to provide a new and improved gate valve, which is simple and durable in construction, very effective in operation, and arranged to readily compensate for any inequalities in the seats and the gate faces, to insure at all times a firm and accurate seating of the valve gates on their seats to prevent leakage, and to allow convenient opening and closing of the gate valve.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement; Fig. 2 is a transverse section of the same on the line 2—2 of Fig. 1; Fig. 3 is a sectional plan view of the same on the line 3—3 of Fig. 1; Fig. 4 is a perspective view of one of the valve gates, and Fig. 5 is a perspective view of a spindle plug.

The body A of the gate valve is provided with oppositely disposed tapering seats B adapted to be engaged by the valve gates C, raised and lowered and pressed to their seats by a spindle plug D connected with an operating mechanism for raising and lowering the spindle plug, the said operating mechanism being preferably in the form of a spindle E having a left hand screw thread screwing in the plug D and mounted to turn in the body A, the upper non-threaded portion E' of the spindle E extending through a stuffing box F, and the upper end of the said non-threaded portion having a wheel G under the control of the operator, for turning the spindle E to raise or lower the spindle plug D whenever it is desired to open or close the gate valve, that is, to move the valve gates C from or to their seats B. The inner or opposite faces of the gates C are provided with dished or concave recesses C' and with top and bottom flanges $C^2$, $C^3$ extending inwardly, as plainly indicated in the drawings, and the said gates C are provided at their front and rear ends with wings $C^4$ extending into guideways H arranged on the inside of the valve body A, as plainly illustrated in Figs. 2 and 3.

The spindle plug D consists of a body D' and a reduced shank $D^2$ interiorly screw-threaded for the spindle E to screw in, and the said body D' is provided with convex faces $D^3$ and similarly shaped fronts and rear sides $D^4$, the said faces and sides $D^3$ and $D^4$ extending into the dished recesses C' of the gates C. The faces and sides $D^3$ and $D^4$ are curved in such a manner that the gates C are free to rock thereon in any desired direction, it being understood that the normal point of contact between the faces $D^3$ and the walls of the recesses C' is approximately central of the opening through the seats B. By reference to Fig. 5 it will be seen that the faces $D^3$ and the sides $D^4$ are somewhat wider on the top than on the bottom, and the curvature on the top towards the middle or contact point is somewhat more abrupt than from the middle down to the bottom of the body D'.

Now by the arrangement described the spindle plug D acts as a wedge or a spreader for forcing the gates C apart and for allowing the gates to accurately seat themselves on their seats B whenever the spindle plug D is moved downward, thus compensating for any inequalities in the seats B or the contacting faces of the gates C.

By the arrangement described the spindle plug acts on the gates C at points in the axis of the valve seats B, to insure pressure against the seats B in all directions and reducing friction to a minimum. It will also be seen that the gate valve may be subjected to hard use and wear, but still in every instance the gates C are firmly forced to their seats by the spindle plug D on closing the gate valve, and the spindle plug can be readily raised and lowered to move the gates C in a like direction.

It is further understood that the top and bottom of the body D' of the spindle plug D engage the flanges $C^2$, $C^3$, so that when the spindle plug D is raised the gates C readily move with the spindle plug to open the valve, and when the spindle plug is moved downward, the bottom thereof by abutting against the bottom flanges C³ moves the gates C in a downward direction.

The gate valve shown and described is composed of comparatively few parts, which can be cheaply manufactured and readily assembled, and permits rough usage of the valve without danger of leakage.

Having thus described my invention, I claim as new and desire to secure by Letters Patent:

1. A gate valve, comprising a casing having oppositely disposed seats, gates having sliding and guided movement in the casing and adapted to be seated on the said seats, said gates having dished and tapering recesses in their opposing faces and inwardly extending flanges at the top and bottom of the said recesses, and a spindle plug having its body fitting in the recesses of the gates and provided with a reduced shank for the attachment of the spindle thereto, the said body being of greater width than thickness and tapering from its upper to its lower end, the faces of the body being convex, the horizontal curvature of the faces from the top to about the middle being greater than from the middle to the lower end.

2. A gate valve, comprising a casing having oppositely disposed tapering seats and vertical guideways at right angles to the seats, gates adapted to be seated on said seats and having dished and tapering recesses in their opposing faces, inwardly extending flanges at the top and bottom of the recesses, and wings on opposite sides and fitting in the guideways of the casing, and a spindle plug provided with a reduced shank for the attachment of the spindle thereto and having its body fitting in the recesses of the gates, said body being of greater width than thickness, tapering from its upper to its lower end and having convex faces.

In testimony whereof I have signed my name to this specification in the presence of two subscribing witnesses.

GEORGE H. BENTON.

Witnesses:
 THEO. G. HOSTER,
 JOHN P. DAVIS.